June 13, 1961 E. O. McALISTER ET AL 2,988,691
GEOPHYSICAL EXPLORATION
Filed Feb. 20, 1957 7 Sheets-Sheet 1

INVENTORS
EDGAR O. McALISTER
ROBERT L. BROXHOLME
RICHARD L. MYERS
BY
ATTORNEYS

June 13, 1961 E. O. McALISTER ET AL 2,988,691
GEOPHYSICAL EXPLORATION
Filed Feb. 20, 1957 7 Sheets-Sheet 2

INVENTORS
EDGAR O. McALISTER
ROBERT L. BROXHOLME
RICHARD L. MYERS
BY
ATTORNEYS

June 13, 1961  E. O. McALISTER ET AL  2,988,691
GEOPHYSICAL EXPLORATION

Filed Feb. 20, 1957  7 Sheets-Sheet 4

FIG. 8a

INVENTORS
EDGAR O. McALISTER
ROBERT L. BROXHOLME
RICHARD L. MYERS
BY
Pennie Edmonds Morton Barrows + Taylor
ATTORNEYS : 2,988,691
Patented June 13, 1961

1

2,988,691
GEOPHYSICAL EXPLORATION
Edgar O. McAlister and Robert L. Broxholme, Tooele, and Richard L. Myers, Salt Lake City, Utah, assignors to The Anaconda Company, New York, N.Y., a corporation of Montana
Filed Feb. 20, 1957, Ser. No. 641,331
10 Claims. (Cl. 324—1)

This invention relates to geophysical exploration by electrical means and more particularly to a method and apparatus for measuring the residual potential or potential gradient existing in a region of the earth after the application of a current pulse to an adjacent region. The invention provides a method and apparatus by means of which such measurements may be made. Particularly the invention permits measurement of the ratio of this residual potential, observed between a pair of receiving electrodes, to the potential existing between those electrodes during the passage thereacross of a current impulse applied to the earth between a pair of transmitter electrodes elsewhere located. In accordance with the invention, such measurement is achieved without signal connection between transmitter and receiver stations other than the earth itself. Moreover, the invention minimizes interference in the measured result due to random electrical noises which produce fluctuating potential differences between a pair of electrodes inserted into the earth.

The invention will be further described with reference to the accompanying drawings in which.

In accordance with the preferred practice of the invention there are applied to the earth at a transmitting station a regular succession of current pulses of successively opposite polarity, successive current pulses being separated by time intervals during which no current is applied. These pulses are applied between two spaced transmitting electrodes in contact with the earth. The wave form of the current passed between the two transmitter electrodes is illustrated in idealized form, at A in FIG. 3. With a transmitted current wave of the type there shown, the variation with time of the potential difference between a pair of spaced receiving electrodes contacting the earth at a receiving station is generally of the type shown at L in FIG. 4.

Figures 2, 4:
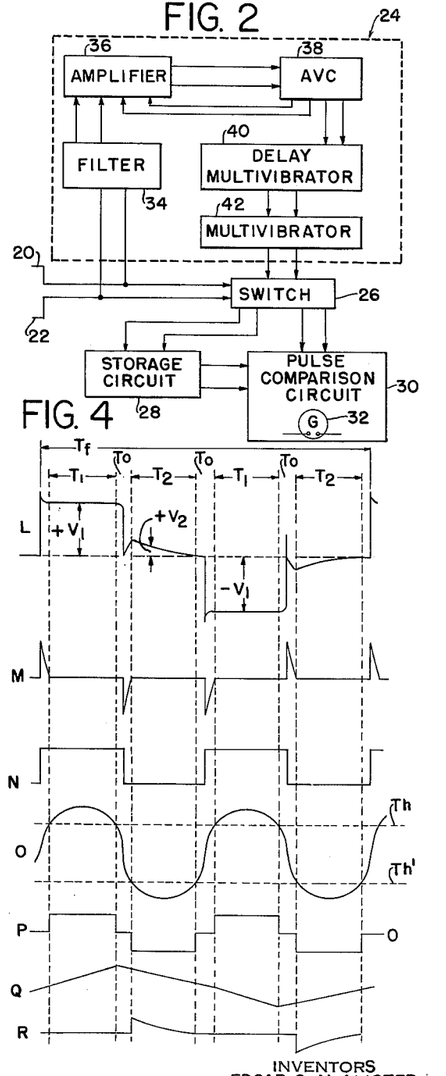
FIG. 2 is a block diagram of a receiving apparatus according to the invention.
FIG. 4 is a set of wave forms useful in explaining the operation of receiver apparatus according to the invention.

The voltage of waveform L in FIG. 4 is seen to comprise approximately rectangular pulses of average and nearly constant value $V_1$ in successively opposite polarity spaced by intervals of lower voltage. The pulses have the same duration and are spaced by the same time interval as the transmitted current pulses of waveform A in FIG. 3. The voltage L in FIG. 4 does not however fall to zero in the interval between pulses $V_1$. Instead there appears a residual voltage of average value $V_2$. This residual voltage $V_2$ is believed to be made up of at least three components. One of these is due to dielectric relaxation effects in the earth which have a long time delay, of the order of the magnitude of the length of the transmitted current pulses themselves. These may advantageously have a length of the order of the magnitude of 100 milliseconds for operation at the preferred operating frequency of the invention presently to be described. A second component may be described as "pulse tails" due to dispersion in the earth of the electromagnetic wave associated with the transmitted current wave form. A third component is that due to a charging of conductive particles in the earth.

With current impulses of suitable length and a suitable delay prior to measurement in accordance with the invention, the effect of the second of these components can be made negligible.

The first of these components is approximately proportional to the voltage gradient existing in the ground during the charging pulses sent out by the transmitter. The third component is, however, not thus proportional to the amplitude of the charging current pulses. It varies instead in a manner characteristic of the earth in the region through which the current pulses are passed. Hence the ratio of the integrated product of voltage and time at the receiving station during the charging impulses $V_1$ (as these appear at the receiving station delayed by the propagation process between transmitter and receiver) to the similar product of voltage $V_2$ and time during the interval between arriving charging pulses, is characteristic of the earth formations between transmitter and receiver stations. This ratio therefore supplies information from which interferences can be drawn concerning the makeup of the earth between transmitting and receiving stations. High values are indicative of disseminated sulphide ores between two stations, or alternatively of carbon-bearing ores.

Figure 1:
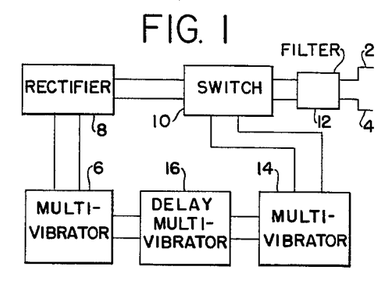
FIG. 1 is a block diagram of a transmitter apparatus according to the invention.
Figure 3:
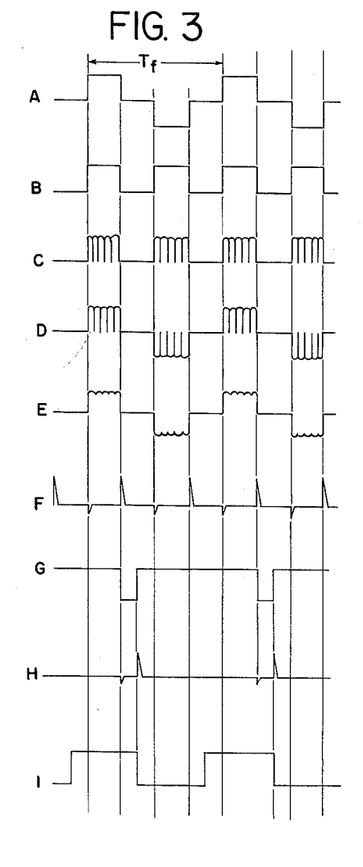
FIG. 3 is a set of wave forms useful in explaining the operation of transmitting apparatus according to the invention.

One form of apparatus according to the invention suitable for application to the earth of current pulses of the form shown at A in FIG. 3 is illustrated in the block diagram of FIG. 1. In this figure two transmitting electrodes 2 and 4 are shown, suitable to be buried in the earth at spaced locations, for example in accordance with the configuration illustrated in FIG. 9. The transmitter of FIG. 1 includes a master oscillator in the form of a multivibrator 6 which develops an output voltage having a waveform as shown at B in FIG. 3. This waveform is applied to a power pulse developing circuit 8 which advantageously takes the form of a full wave rectifier, converting an A.C. power wave from a suitable source, not shown, into pulses of unidirectional current as indicated at C in FIG. 3. These pulses pass through a switch 10 where they are converted into a waveform as shown at D in FIG. 3. A filter 12 then removes or minimizes the A.C. ripple appearing in waveform D to produce waveform E, essentially similar to waveform A.

The switch 10 may take the form of a double pole, double throw relay operated switch driven by a polarity switching multivibrator 14 which has a repetition rate one-half the rate of the master oscillator 6. Suitable phasing of the output of multivibrator 14 is effected by means of a 2:1 frequency dividing multivibrator 16 which is controlled by and has a repetition rate $1/T_t$ one-half that of multivibrator 6. The multivibrator 16 may be triggered by means of a pulsating signal of the same frequency as the output wave of multivibrator 6, for example as shown at F in FIG. 3. Such a waveform can be derived from waveform B, the output of multivibrator 6, in a differentiating and clipping circuit according to known methods. Multivibrator 16, thus triggered by waveform F, produces an output waveform as indicated at G and this waveform, suitably differentiated and clipped into the shape of waveform H, controls the polarity switching multivibrator 14 to develop there an output waveform I for control of the switching relay 10. At the output of relay 10, therefore, the rectified voltage from rectifying unit 8 possesses the shape of waveform D which, after the filtering, is applied to the transmitter electrodes or stakes 2 and 4 in the form of waveform E, which is periodic in the time interval $T_t$.

A receiving apparatus according to the invention is shown in block diagram form in FIG. 2. The input terminals to the receiver are connected to a pair of grounded electrodes 20 and 22. The signal appearing across these electrodes, of the form of waveform L in FIG. 4 which is periodic in the interval $T_t$, passes into two separate channels. The first of these is a synchronizing channel generally indicated at a dash line box 24, the function of which is to develop a switching voltage properly related in time phase to waveform L for the operation of a switching unit 26. The received signal is also applied to the switching unit 26 and from there selected phases of the signal are channeled under control of the switching voltage developed in circuit 24 to a storage circuit 28 and to a pulse comparison circuit 30. The pulse comparison circuit 30 includes a tuned A.C. galvanometer 32 for detection of balance between a charged stored in circuit 28 during one phase of waveform L and that applied to the pulse comparison circuit 30 during another phase.

The switching voltage generating circuit 24 may include a trap or filter 34 designed to eliminate from the synchronizing channel known interfering noise voltages such as those of 60 cycle power lines for example. The received signal is then amplified in an amplifier 36. In the output of amplifier 36 a differentiating network derives from the amplified version of waveform L a wave at indicated at M in FIG. 4. Waveform M is passed to a delay multivibrator 40, advantageously through a delayed automatic volume control circuit 38.

As indicated at waveform N, multivibrator 40 has a repetition rate twice that of the received signal L. Multivibrator 40 drives at its own rate an output multivibrator 42, the plates of which are fed into the primary winding of a transformer forming part of switch 26. This transformer is tuned to possess a fundamental frequency equal to the repetition rate of multivibrator 40, and the secondary of the transformer is loaded with the actuating coil of a polarized relay in switch 26. The contacts of this relay are normally open and are arranged to function as a double pole, double throw switch with electrodes 20 and 22 connected to the poles thereof, with circuit 28 connected to one set of stationary contacts, and with circuit 30 connected to the other.

The transformer secondary current then posses the approximately sinusoidal form shown at waveform O in FIG. 4. The amplitude of this waveform is adjusted with respect to the threshold operating levels of the relay so as to effect closing of the movable or common relay contacts, i.e. of the poles thereof, preferably for substantially equal times on both sets of stationary contacts. This in indicated in waveform O by the symmetrical positioning of the threshold levels $Th$ and $Th'$ with respect to the A.C. axis of the wave. For current values between these thresholds the relay contacts are opened.

The operation of the contacts in switch 26 is indicated by waveform P in FIG. 4 where the time above the A.C. axis represents closure on one set of stationary contacts (that of circuit 28), while the time below the A.C. axis represents closure on the other set of stationary contacts which belong to circuit 30.

Delay multivibrator 40 is so adjusted that, as indicated in waveform P, the closure times $T_1$ for switch 26 which connect receiver electrodes 20 and 22 to the storage circuit 28 are centered on the received voltage pulses $V_1$, while the closure times $T_2$ which connect electrodes 20 and 22 to the pulse comparison circuit 30 are centered on the residual pulses $V_2$.

Figure 5:
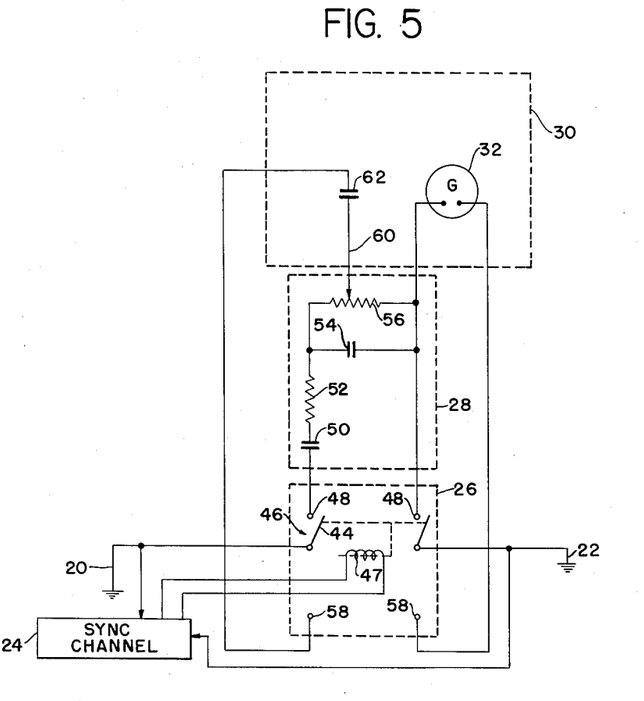
FIG. 5 is a simplified diagram of one part of the circuit of the receiver of FIG. 2.

A schematic diagram of that portion of FIG. 2 which includes the switch poles and contacts of circuit 26 and elements 28, 30 and 32 is shown in FIG. 5. Here receiver electrodes 20 and 22 are seen to connect with the movable contacts or poles 44 of a double pole, double throw relay-operated switch generally indicated at 46, which is included in switching circuit 26. The actuating coil is shown at 47, energized from the synchronizing channel 24. One pair of stationary contacts 48 leads to a storage circuit shown at the dash line box 28. This circuit includes a D.C. blocking condenser 50, a charge rate limiting resistor 52, a storage condenser 54, and a potentiometer resistor 56 across it. The pulse comparison circuit indicated at dash line box 30 is connected on the one hand to the other pair of stationary contacts 58 of switch 46, and on the other hand to one terminal of potentimeter resistor 56 and to a tap 60 thereon. The pulse comparison circuit includes a D.C. blocking condenser 62 and a tuned A.C. galvanometer 32.

Referring again to FIG. 4, transmission through coil 47 in FIG. 5 of a current as indicated in waveform O produces for the contacts of switch 46 driven thereby a closing sequence as indicated at waveform P. For the times $T_1$ during the directly received voltage pulses $V_1$, the receiver electrodes 20 and 22 are connected to storage circuit 28. For the times $T_2$ during the residual pulses $V_2$ electrodes 20 and 22 are connected to potentiometer circuit 30, and for the intervening times $T_0$ the switch contacts are opened. The provision of a finite open time $T_0$ between times $T_1$ and $T_2$ minimizes the effect on the measured result of transient voltages in the ground associated with the beginning and end of the transmitted current pulses. Preferably the transmitted current pulses are separated by no-current intervals of the same length. This makes it convenient to provide at the receiver switching phases $T_1$ and $T_2$ of the same length. Equality of these phases is determined by adjustment of waveform O so that the portions thereof above threshold $Th$ have the same time duration as the portions thereof below threshold $Th'$.

With such operation for the switching device 26 there results for the storage capacitor 54 in FIG. 5 a charge and discharge sequence of the general nature indicated at waveform Q, which represents the voltage across capacitor 54 and hence across the potentiometer resistor 56.

At waveform R there are shown the portion of the residual potential pulses $V_2$ occurring during time phases $T_2$. Waveform R hence simply represents so much of waveform L as takes place within phases $T_2$, although not necessarily to the same vertical scale. The voltage pulses of waveform R are applied through circuit 30 of FIG. 5 to potentiometer resistor 56 between the tap 60 thereon and the galvanometer 32. The polarity of the connections is such that the voltage pulses of waveform R oppose in resistor 56 the discharge voltage of waveform Q stored in capacitor 54.

By adjustment of tap 60 there may be selected a fraction of the amplitude of waveform Q (which is not necessarily drawn to the same vertical scale as waveform R) which will, in the times $T_2$, substantially match waveform R. When this condition is satisfied, as indicated for example by zero net current in tap 60 over any one time interval $T_2$, a measure is obtained of the desired ratio $V_2T_2/V_1T_1$.

In accordance with the preferred practice of the invention however, instead of matching total voltage-time products, a match is made of the amount of A.C. voltage present at the repetition rate of the complete signal. The received signal of waveform L is of course cyclical in a period identified as $T_f$ in FIG. 4, which is the same as the period $T_f$ of waveform A at the transmitter. $T_f$ may have a value of the order of ⅓ of a second, fundamental operating frequencies for the apparatus of the invention being of the order of from 2 to 20 cycles per second.

To determine whether the waveform R and so much of waveform Q as occurs within the intervals $T_2$ possess the same ingredient at the fundamental frequency $1/T_f$, the receiver of FIG. 5 includes a galvanometer 32 which is tuned to that frequency.

Advantageously the galvanometer 32 is a center null type of instrument capable of deflection in both directions therefrom in response to currents of opposite polarity, and the moving elements of the galvanometer are tuned to give to it a natural frequency equal to the repetition rate $1/T_f$. Since the galvanometer 32 responds substantially only to energy of this frequency, a null indication thereon is indicative of equality between the component of that frequency in the cyclical residual potential pulses $V_2$ and the portion of the discharge potential from capacitor 54 which is selected at tap 60. For a given repetition frequency $1/T_f$ the potentiometer can be calibrated to read directly in terms of the desired ratio $V_2T_2/V_1T_1$.

In accordance with the preferred practice of the invention the times of closing in opposite polarity of the switch 46 are equal so that the times $T_1$ and $T_2$ are equal. This is, however, not a necessary feature of the invention.

Figure 6:
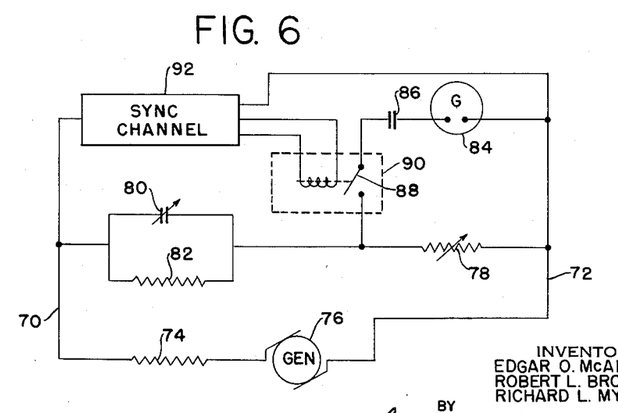
FIG. 6 is a simplified diagram of an alternative circuit according to the invention usable in place of that illustrated in FIG. 5.

Another form of ratio measuring circuit is illustrated in simplified schematic form in FIG. 6. In the receiver of FIG. 6 conductors 70 and 72 represent the leads to the receiver stakes such as the stakes or electrodes 20 and 22 of FIG. 5. A resistor 74 represents the contact resistance between these stakes and the earth. In series with leads 70 and 72 there is shown symbolically a generator 76 which represents the source of the received voltage wave L of FIG. 4. Conductors 70 and 72 are further connected together by a series circuit including a variable resistance 78 and a parallel resistance-capacity circuit including a variable capacity 80 and a resistance 82. A tuned galvanometer 84 which may be similar to the galvanometer 32 of FIG. 5 is connected in series with a blocking condenser 86 so as to be connectible across the resistance 78 by means of a single pole, single throw switch 88 forming a part of a relay indicated at the dashline box 90, which is driven by a synchronizing circuit 92 like the circuit 24 of FIGS. 2 and 5.

Switch 88 is operated to close only during the times $T_2$ of FIG. 4, i.e. at a $2/T_f$ rate. The operation of the circuit may be explained generally by noting that during successive of the main received pulses $V_1$ the capacitor 80 is charged in successively opposite polarities, generally as indicated at Q in FIG. 4. The pulses $V_1$ have an average amplitude at least an order of magnitude higher than the pulses $V_2$. Hence the charging effect of the $V_2$ pulses on the charge in capacitor 80 is small. Consequently between the pulses $V_1$ capacitor 80 discharges through resistor 82 and also through resistor 78 and resistance 74 in series. The condenser discharge current through the latter path is however matched against the oppositely directed charging current due to $V_2$.

Galvanometer 84 is connected across resistor 78 during the fractions $T_2$ of the residual voltage pulses $V_2$, and by successive adjustments of capacitor 80 and resistor 78 the galvanometer can be brought to a null reading. From the values of capacitor 80 and from resistance values 78, 74 and 82 the ratio $V_2T_2/V_1T_1$ can be calculated as will be further described in connection with FIG. 10.

Apparatus of the type schematically indicated in FIG. 6 has been successfully operated with a value for resistor 82 of 25,000 ohms with a capacitor 80 variable between 0 and 4 microfarads and with a resistance 78 variable between 100,000 ohms and several megohms.

Figure 7:
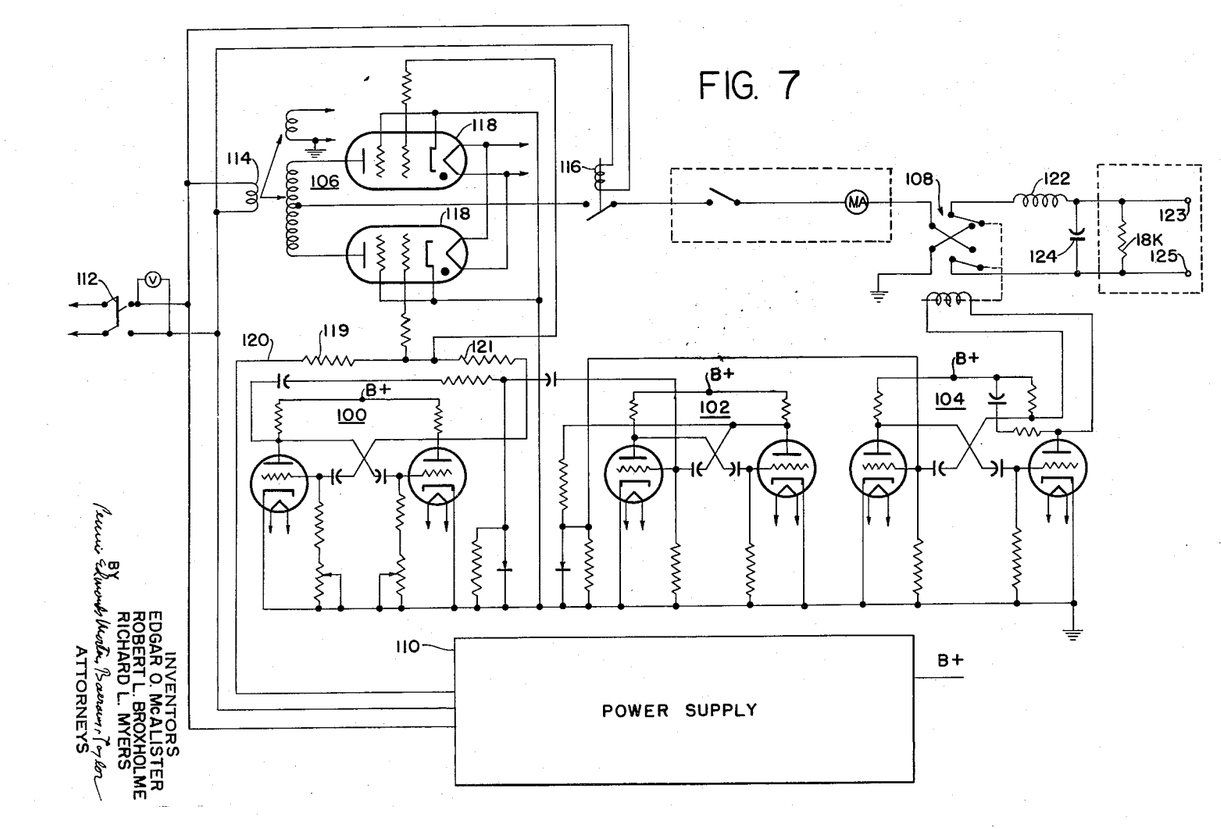
FIG. 7 is a schematic diagram of one form of a transmitter apparatus according to the invention.

FIG. 7 is a schematic diagram of a preferred form of transmitter according to the invention. It includes three multivibrators generally indicated at 100, 102 and 104, a rectifier generally indicated at 106 and a double pole double throw relay-operated switch generally indicated at 108. A power supply is shown at 110. Power, obtained for example in field work at 110 volts, 400 cycles from a portable engine driven generator, is applied through a master switch 112 to power supply 110. This supply develops the regulated D.C. voltages necessary for operation of other elements of the transmitter. Switch 112 also controls application of the A.C. power to the primary of a transformer 114 associated with rectifier 106 and to a time delay relay 116. When relay 116 is closed, it connects the output of rectifier 106 with relay 108.

Multivibrator 100 is free running and produces a square wave output, the plates of its tubes having conducting and non-conducting phases of equal length as indicated at waveform B in FIG. 3. According to presently preferred practice of the invention the pulse repetition frequency of multivibrator 100 is of the order of six cycles per second. Multivibrator 102 runs at half the frequency of multivibrator 100 and has an asymmetrical output waveform as indicated in waveform G in FIG. 3. The back edge of the asymmetrical pulse of multivibrator 102 is used to synchronize multivibrator 104, which has a square wave, in order that relay 108 may shift its contacts during intervals between the output current pulses from the rectifier. These output pulses are shown at waveform C in FIG. 3. Multivibrator 104 thus develops a square wave of one-half the pulse repetition frequency of multivibrator 100 as indicated at waveform I, and therewith drives relay 108. Relay 108 may be of a spring-loaded type, its movable poles making contact with one set of stationary contacts by energization of its coil when the righthand tube in multivibrator 104 conducts and making contact with the other set of stationary contacts when that tube is cut off.

Rectifier 106 is driven by multivibrator 100 to develop pulses of full wave rectified voltage as indicated in waveform C in FIG. 3. It includes two grid controlled gas tubes 118 whose control grids are connected through a resistor 119 to a line 120 held by power supply 110 at a negative bias level below the ionization potential of those tubes. These grids are also connected through a resistor 121 to the plate of the righthand tube in multivibrator 100. When this tube is cut off, the grids of the gas tubes 118 are lifted into the conducting region.

Inductance 122 and capacitor 124 form a filter for the output from rectifier 106 after it has passed through relay 108, so that the current waveform applied to the transmitter output terminals 123 and 125 is as shown at E in FIG. 3. These terminals are connected through conductors insulated from the earth to two spaced transmitter stakes or electrodes driven or buried in the ground. For a pulse repetition frequency of 6 c.p.s. for multivibrator 100, the frequency $1/T_f$ of the fundamental component in waveform E is 3 c.p.s., waveform E including current pulses of successively opposite polarity each 83.3 milliseconds long separated by 83.3 millisecond intervals, the pulses having an 800 c.p.s. residual A.C. ripple thereon.

Figure 8A:
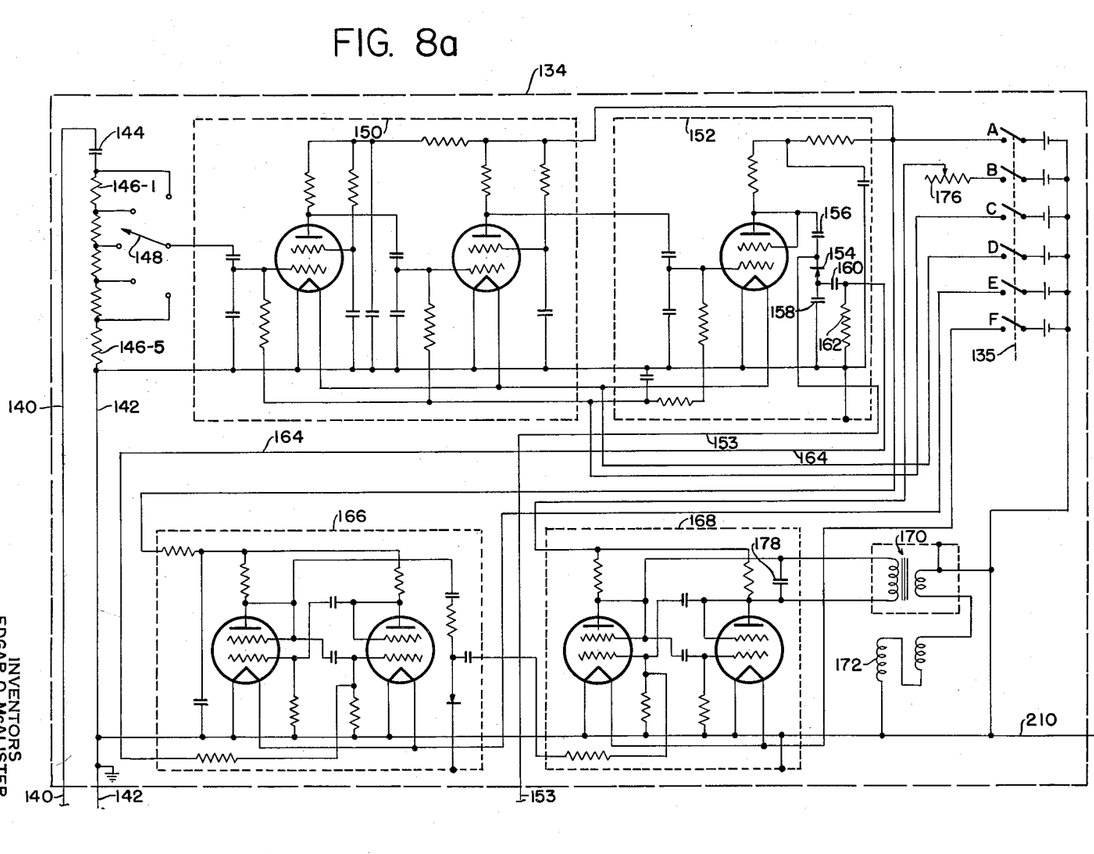
FIGS. 8a, 8b and 8c together form a schematic diagram of a receiver apparatus according to the invention.
Figure 8B:
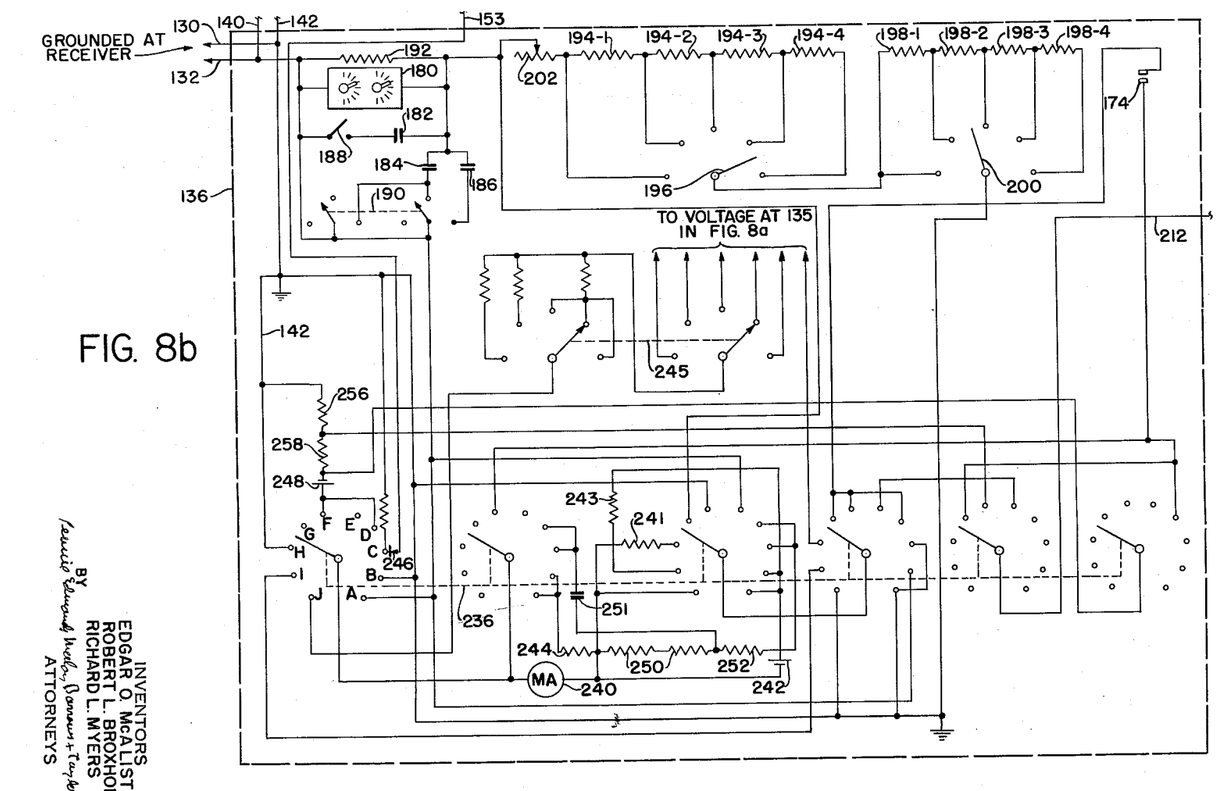
Figure 8C:
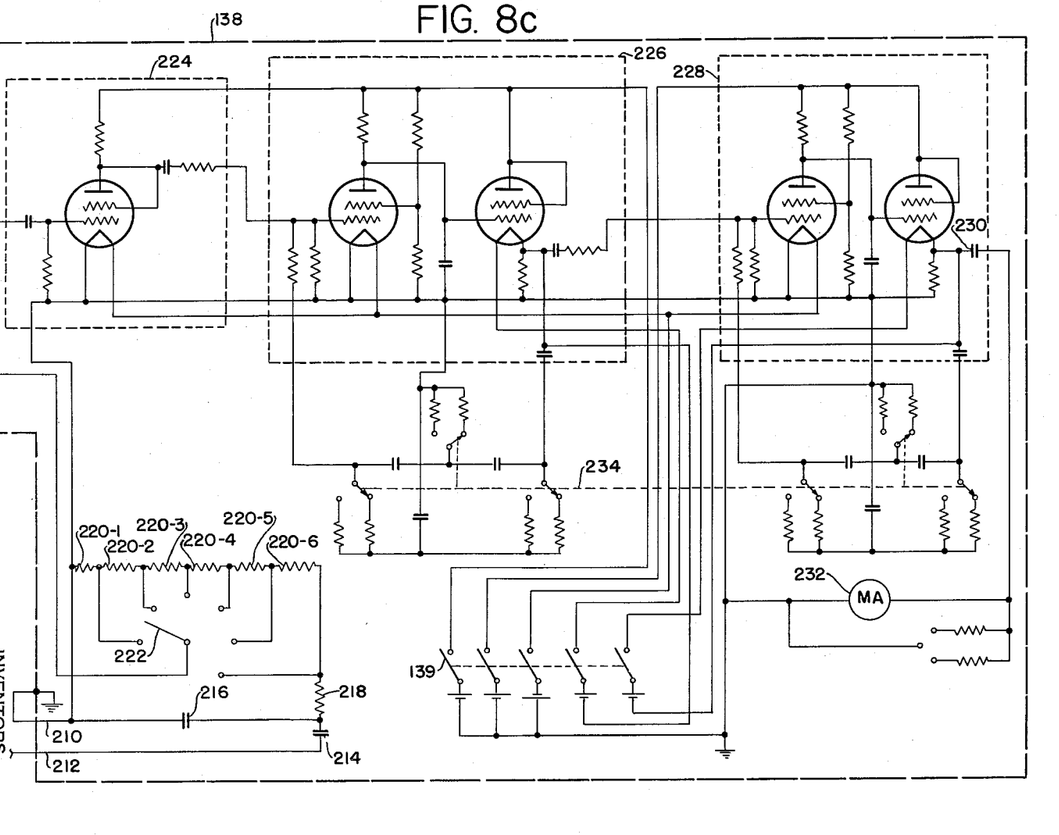

FIGS. 8a, 8b and 8c contain a schematic diagram of a preferred form of receiving apparatus according to the invention, incorporating the receiver of FIG. 6 and certain auxiliary apparatus. The two receiver electrodes or stakes are indicated at 130 and 132 in FIG. 8b. Stake 130 is preferably driven into the ground in the immediate vicinity of the receiver apparatus, whose case or housing is electrically connected thereto, i.e. "grounded." Stake 132 is driven into the ground at a substantial spacing from stake 130, for example closer to the transmitting station in accordance with an electrode pattern of the type illustrated in FIG. 9. It is connected to the receiver apparatus of FIG. 8 by means of an insulated cable, which may advantageously be shielded.

The resistance between stakes 130 and 132 varies from perhaps 50 ohms to perhaps 10,000 ohms. There is in addition a capacitive effect due to the electrolytic contact of the stakes with the earth. For the two stakes in series this amounts to perhaps 1,500 microfarads which makes a reactance of about $-j35$ ohms for a pulse repetition frequency or recurrence rate $1/T_f$ of three cycles per second. Since the pulse monitoring path of the receiver, shown in simplified form in FIG. 6, is never less than 100,000 ohms, this reactance can cause a phase shift of no more than about $\tan^{-1} -j35/100,000$ or about one mnute of arc. For measured ratios of $V_2T_2/V_1T_1 = 0.1$, or tan 6°, the error thus introduced by the electrolytic contact at the receiver stake is of the order of one part in 360. For $V_2T_2/V_1T_1$ ratios of the order of tan 30', the resistance of the monitoring loop is of the order of 1 megohm, and the error thus introduced is of about 0.1' or again one part in 300. These errors may be neglected.

The receiver of FIGS. 8a–8c can be considered to comprise essentially three portions, a synchronizing and relay driving unit whose elements are enclosed within a dash-line box 134 in FIG. 8a, a ratio-measuring and test unit indicated at a dash-line box 136 in FIG. 8b, and a tuned galvanometer unit indicated at a dash-line box 138 in FIG. 8c.

The synchronizing and relay driving circuit 134 will be considered first. The received signal, of the form of waveform L in FIG. 4, is applied via a shielded input lead 140 connecting to stake 132 and a grounded lead 142 from stake 130 to a differentiating network comprising a capacitor 144 and one of a plurality of resistors 146–1 to 146–5 of different values selected by means of a switch 148. This circuit extracts from the main received pulses $+V_1$ and $-V_1$ of waveform L in FIG. 4 not only a sharp signal representative of the leading edge thereof but also the ripple voltage which is present thereon in consequence of the ripple voltage present on the transmitted pulses as indicated in waveform E in FIG. 3. The network therefore sends to the amplifiers which follow it a succession of bursts of A.C. voltage, for example at 800 cycles for a 400 cycle transmitter power supply, these bursts having the length of the transmitted current pulses and having a frequency of $2/T_f$, or 6 c.p.s. in the illustrative case above mentioned.

The A.C. voltage bursts thus selected are passed through a two-stage amplifier unit 150 and a one-stage amplifier unit 152 in cascade. These may be constructed as plug-in units for simple replacement in field operations. With the operation of the differentiating circuit just described amplifiers 150 and 152 may be constructed with a frequency pass band extending from about 200 c.p.s. to 10 kc. This pass band eliminates pick-up from 60 cycle power lines and the first two harmonics thereof and also certain additional interfering signals of higher frequency.

Amplifier units 150 and 152 together provide three stages of resistance-capacity coupled amplification with a gain of about 10,000. In the output of the last of these stages a diode 154 with associated capacitors 156, 158 160 and a resistor 162 rectifies the first few cycles of each A.C. burst extracted at the differentiating circuit preceding amplifier 150 and develops therefrom a strong negative-going pulse of pulse repetition frequency $2/T_f$. Rapid charging of capacitors 158 and 160 cuts off conduction through diode 154 after the first few cycles of the 800 c.p.s. burst signal so that no signal is delivered by the discontinuity appearing at the end of each burst. The accumulated charge then leaks off between bursts through resistor 162 in time for the development of a negative pulse at the beginning of the next burst. The negative pulse so developed is passed via a lead 164 as a synchronizing signal to a delay multivibrator generally indicated at 166.

The negative-going signal from diode 154 cuts off conduction in the right-hand half of multivibrator 166 and the resulting negative plate voltage pulse in the left-hand tube is used as a synchronizing signal for a relay driving multivibrator generally indicated at 168. Both of the multivibrators 166 and 168 hence operate at a pulse repetition frequency of $2/T_f$. The primary winding of a tuned transformer 170 is connected in the circuit of the plates of multivibrator 168. There is consequently developed in the secondary winding of the transformer an approximately sinusoidal current of frequency $2/T_f$, as indicated at waveform O in FIG. 4. This current is sent through the actuating coil 172 of a polarized relay whose contacts are shown at 174 in the ratio-measuring circuit 136 of FIG. 8b. Contacts 174 closes at a $2/T_f$ rate, each closing occurring for a time $T_2$ (FIG. 4) within the interval between the main received voltage pulses $V_1$.

Adjustment of the closing time of relay contacts 174 is made by adjusting at a potentiometer 176 in FIG. 8a the B+ voltage applied to multivibrator 168. The phase can also be controlled by adjustment of the value of a capacitor 178 across the primary of transformer 170.

The synchronizing unit 134 is also shown as containing the power supply for that unit and for unit 136 of FIG. 8b, schematically indicated by means of a plurality of batteries connected between ground and the poles of a multipole switch 135. A similar switch 139 in the galvanometer circuit 138 of FIG. 8c controls the application of power to the elements of circuit 138.

The ratio-measuring and galvanometer circuits indicated at the dash-line boxes 136 and 138 of FIGS. 8b and 8c embody the circuit of FIG. 6, together with certain elaborations and a number of test circuits for checking the operation of the receiver.

In the ratio-measuring circuit the adjustable capacity corresponding to capacitor 80 of FIG. 6 comprises a decade capacitor unit 180, adjustable for example in steps of 0.01 mfd. from 0.01 mfd. to 1.1 mfd., and the capacitors 182, 184 and 186 connectible in parallel therewith under control of switches 188 and 190. The resistor corresponding to resistor 82 of FIG. 6 is identified in FIG. 8b at 192, in parallel with the decade capacitor unit 180.

The variable resistance corresponding to resistor 78 of FIG. 6 across which the galvanometer circuit is periodically connected by relay contacts 174 comprises in FIG. 8b a plurality of resistors 194–1 to 194–4 of graduated values among which selection is made by a switch 196, a further plurality of resistors 198–1 to 198–4 as selected by a switch 200, and a continuously adjustable resistor 202. The common pole or blade of switch 200 is D.C. connected to stake 130.

The stake or electrode 130 which is driven into the ground adjacent the receiver apparatus is connected into the galvanometer circuit of FIG. 8c at a lead 210. This corresponds to the lead 72 of FIG. 6. For measurement of the desired ratio $V_2T_2/V_1T_1$ the end of the variable resistance selected by switches 196 and 200 which is adjacent decade capacitor 180 connects with the galvanometer circuit via relay contacts 174 through a six-pole ganged switch 236 in position G thereof, and via a lead 212 which is advantageously shielded. Within galvanometer unit 138 a blocking capacitor 214 then leads into an integrating network comprising a parallel capacitor 216 and a series resistor 218. This circuit smooths any sharp spikes appearing at the start of the portion of $V_2$ selected by the relay contacts 174, for example those due to relay contact action. A switch 222 then permits control of the input signal level to the galvanometer circuit by means of a plurality of resistors 220–1 to 220–6, which can be cumulatively inserted in series with lead 212.

The galvanometer circuit includes a preamplifier stage generally indicated at 224 followed by two two-stage Wien-bridge amplifier circuits generally indicated at 226 and 228. These provide negative feedback at other than their preferred frequency to discriminate against signal components other than the one desired. Under operating conditions this desired component has the frequency $1/T_f$.

The output of amplifier 228 passes through a large capacitor 230 to a microammeter 232, the opposite terminal of which is grounded. Meter 232 is preferably a center null type instrument whose needle and moving coil system is adjusted to have a natural frequency of mechanical oscillation at the frequency $1/T_f$. The meter preferably has a very high sensitivity, being advantageously able to detect currents of the order of $10^{-12}$ amperes.

For checking the operation of the galvanometer circuit 138, i.e. the over-all gain thereof and in particular that of the Wein bridge amplifiers, a ganged switch 234 is provided in the feedback connections of those amplifiers by means of which their tuned frequency can be changed from $1/T_f$ to $2/T_f$. $2/T_f$ is selected because relay contacts 174 close at a $2/T_f$ rate. This permits the generation of a calibration signal at $2/T_f$ frequency in unit 136 by means of a standard cell 248.

In the ratio-measuring circuit 136 switch 236 permits establishment of test circuits. These tests are preferably performed each time the receiver is set up for operation in a different position. The positions of switch 236 are identified in the drawing as A to J and have the following functions:

A. In position A a microammeter 240 with a resistor 244 of low value in parallel therewith is connected in series with a battery 242 between electrode stakes 130 and 132 for an approximate measurement of the contact resistance of the stakes.

B. In position B, the connection of the circuit of position A to the ground is reversed, sending the current from battery 242 through the earth in the opposite direction.

From the average value of the current readings obtained in positions A and B for switch 236 and from the voltage value of battery 242 and the resistance value of resistor 244 there may be computed an approximate value of the contact resistance between the stakes 130 and 132.

C. In position C of switch 236 the output of the amplifier 152 of FIG. 8a is connected via a lead 153 to a diode 246 in FIG. 8b and hence to meter 240 and ground through resistors 250 and 252 in order to obtain a measure of the amplitude of the synchronizing signal sent by amplifier 152 to multivibrator 166. The amplitude of this signal can be adjusted by means of the input level selector switch 148 which precedes amplifier unit 150 at the input end of the synchronizing and relay driving unit 134.

D. In position D a standard cell 248 is connected into a series circuit containing relay contacts 174, resistor 250 and meter 240, capacitor 251 in parallel with meter 240 and resistor 250 serving to smooth through the meter the unidirectional curent pulses passed by the relay contacts. The value of the average current so measured provides a measure of the time $T_2$ (see FIG. 4) during which contacts 174 are closed. This current is set to an empirically selected value by adjustment of the potentiometer 176 which controls the B+ voltage applied to multivibrator 168.

E. In position E the galvanometer circuit 138 is connected across electrode stakes 130 and 132. The galvanometer then picks out and measures the amplitude of the fundamental component of $1/T_f$ frequency in the total received signal shown at waveform L in FIG. 4 which is applied across the stakes. In view of the fact that $V_1$ is much greater in amplitude than $V_2$, this means substantially the $1/T_f$ component in the main received pulse $V_1$. From this measurement and from the known or measured value of current delivered by the transmitter to the earth, the apparent resistivity of the earth can be computed by reference to the geometry of the electrode stake positions at the transmitting and receiving stations.

F. In position F the standard cell 248 is connected into a loop including two resistors 256 and 258 and the relay contacts 174, with the galvanometer circuit 138 connected across resistor 256. There flow in this loop unidirectional current pulses having a fundamental component of frequency $2/T_f$ of known size, given a specified closing time $T_2$ for contacts 174. This circuit thus generates a calibrating signal employed to test the response of the galvanometer circuit 138. In performing this test switch 234 is shifted to the position which places the pass frequency of amplifiers 226 and 228 at $2/T_f$.

G. In position G of switch 236 the receiver of FIG. 8 is connected in accordance with the showing of FIG. 6 for measurement of the ratio $T_2V_2/T_1V_1$. For this measurement switch 234 is set to provide amplifiers 226 and 228 with a pass frequency $1/T_f$.

H. In position H switch 236 connects meter 240 through a resistor 241 to read the voltage of the bias battery associated with pole C of switch 135.

I. In position I switch 236 connects meter 240 through resistor 243 to read the voltage of the cell 242.

J. In position J switch 236 connects meter 240 into a circuit including a switch 245 by means of which the other supply voltages controlled by switch 135 may be checked.

Figures 9, 10:
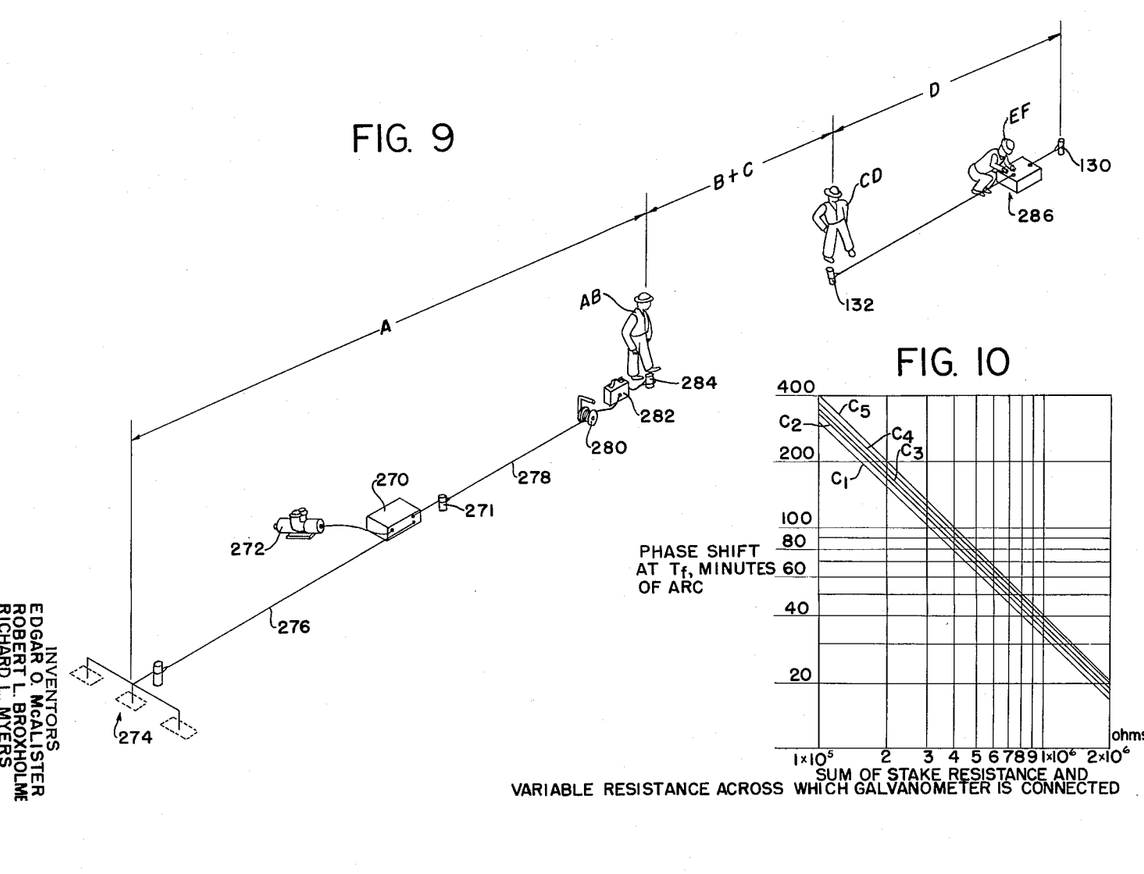
FIG. 9 is a diagram illustrating the use of the apparatus of the invention in the field.
FIG. 10 is a graph useful in interpreting the data measured with receivers of the types illustrated in FIGS. 6 and 8a, 8b, and 8c.

Typical field operations according to the invention are illustrated in FIG. 9. In FIG. 9 the transmitter of FIG. 7 is indicated at 270, energized from an engine-driven generator 272. One current electrode is generally indicated at 274. It may comprise several sheets of metallic screening a foot or two square buried in the ground and electrically connected together and to the conductor of an insulated cable 276 which connects with one of the current terminals 123 and 125 of FIG. 7. The other transmitter current terminal is connected to the conductor of an insulated cable 278 which may be carried on a reel 280. The stake 271 adjacent transmitter 270 is without electrical significance; it is provided to take the mechanical stress involved in unreeling cable 278.

The other current electrode 284 for the transmitter, which may for example take the form of a steel stake, is connected through a current monitoring meter 282 to an insulated conductor which can be plugged in for connection with cable 278 at a jack provided on reel 280.

In typical operations the separation of the two current electrodes may be changed during a course of measurements from a minimum value of some 2,000 feet to a maximum value of 7,000 or 8,000 feet, receiver readings being taken for a plurality of intermediate values of this separation. A transmitter operator AB handles the reel 280, stake 284 and meter 282. Meter 282 is an A.C. meter, a uniform reading on which indicates uniformity of the transmitted current pulses.

The receiver apparatus may be handled by two operators indicated at CD and EF in FIG. 9. Operator CD handles the "back" potential or receiver electrode 132 while operator EF handles the receiver itself generally indicated at 286 and the adjacent electrode 130. Typically the spacing of the two-receiver electrodes may be of the order of from 400 to 1,000 feet, with all four transmitter and receiver electrodes collinearly arranged. The separation of the transmitter electrode 284 from the adjacent receiver electrode 132 may in typical operations be of the order of from 400 to 1,000 feet.

With the transmitter properly running as indicated by the reading observed on meter 282, the receiver is put through the various tests provided by the switch 236 (FIG. 8b). Thus with the galvanometer sensitivity control 222 of FIG. 8c in the minimum sensitivity position indicated by the left-most tap on that switch, measurements of the receiver electrode stake resistance are made with switch 236 in positions A and B, The synchronizing signal for operation of the relay driving multivibrator 168 is then checked with switch 236 in position C and switch 148 is adjusted as necessary.

The closing time $T_2$ for the relay contacts is then adjusted by means of the voltage control 176 with switch 236 in position D.

The value of the $1/T_f$ component in the received signal is next measured with switch 236 in position E, for example by noting the position of galvanometer sensitivity control 222 required to obtain a given amplitude of swing on meter 232. Both setting and amplitude should be recorded.

The gain of the galvanometer circuit to a standard signal of $2/T_f$ frequency is next obtained with switch 236 in position F and with switch 234 in the $2/T_f$ frequency position, the galvanometer circuit gain being recorded in terms of the amplitude of oscillation of meter 232 and the accompanying setting of galvanometer gain control 222.

The receiver is now ready for the measurement of $T_2V_2/T_1V_1$ with switch 234 shifted to the $1/T_f$ frequency position and with switch 236 in position G. With switches 188 and 190 and the capacitor decade unit 180 set to place in parallel with resistor 192 a total capacity of suitable value readily determined by experience, for example 2 mfd., the galvanometer sensitivity is raised from a minimum value as required to obtain moderate deflection on meter 232. Switches 196 and 200 and variable resistor 202 are then adjusted for best galvanometer null. The galvanometer sensitivity is then further raised and the capacitor unit 180 is reset for null. Variable resistor 202 can then be again adjusted to minimize the reading at meter 232. While this is customarily sufficient, the resistance and capacity settings may be successively further corrected as often as desired. The noted sum of the capacity in parallel with resistor 192 and of the resistance placed in circuit by switches 196 and 200 and by variable resistor 202 permits inference of the value $V_2T_2/V_1T_1$. The operator EF then signals the completion of his readings, and the three operators advance to new positions.

Determination of the value of the ratio $V_2T_2/V_1T_1$ is made from the value of capacity placed in parallel with resistor 192 and from the value of resistance inserted at switches 196 and 200 and at the potentiometer 202 which are required for null on the galvanometer, and from the measured value of the stake resistance. In terms of FIG. 6, the determination is made from the values of the capacitor 80 in parallel with resistor 82 and of the resistor 78 which are required for a null on the galvanometer 84 of that figure and from the measured value of stake resistance 74.

By comparison with the state of affairs obtaining when there is no residual voltage (i.e. no voltage during the intervals $T_2$ of FIG. 4), the presence of component of voltage at the frequency $1/T_f$ across the receiver stakes during the intervals between the main received pulses $V_1$ may be regarded as a shift in the phase of the aggregate $1/T_f$ component present in the total signal which appears across the stakes, and the desired ratio $V_2T_2/V_1T_1$ may thus be considered as the tangent of this phase shift angle.

A null reading on the galvanometer represents a set of values for the receiver circuit connected to the stakes and in particular, in the embodiment illustrated, a set of values for the variable capacitor 80 and resistor 78 (in the embodiment of FIG. 6) such that this phase shift which characterizes the wave actually present in the earth at the location of the receiver stakes is compensated across the variable resistor 78 in parallel with which the galvanometer is periodically connected at the $2/T_f$ rate for the intervals $T_2$. The circuit comprises in FIG. 6 the elements 74, 78 80 and 82 and may be solved for any given frequency $1/T_f$ to give the desired ratio $V_2T_2/V_1T_1$ or $\theta = \tan^{-1} V_2T_2/V_1T_1$ in terms of the variable capacitor 80 and in terms of the sum of resistor 78 and the stake resistance 74.

Similarly the circuit comprising analogous elements of FIGS. 8a, 8b and 8c can be solved likewise. The equivalence between the circuit elements of the two figures is as follows:

| FIG. 6 | FIGS. 8a, 8b, 8c |
|---|---|
| Value of variable capacitor 80 for galvanometer null. | Sum of capacitors 180, 182, 184 and 186 employed for galvanometer null. |
| Value of resistor 78 employed for galvanometer null. | Sum of resistance inserted at switches 196 and 200 and at potentiometer 202 for galvanometer null. |
| Fixed resistor 82. | Fixed resistor 192. |
| Stake resistance 74. | Stake resistance as computed from the average of the readings on meter 240 with switch 236 in positions A and B and from the voltage of battery 242 and value of resistor 244. |

For a frequency $1/T_f = 3$ c.p.s. the solution of this circuit in terms of its embodiment into an apparatus according to FIGS. 8a, 8c is plotted in FIG. 10 for four different values of the variable capacity in terms of the sum of the stake resistance and the variable resistance inserted at switches 196 and 200 and at potentiometer 202. All data is plotted for a fixed value of the resistor 192 of 25,000 ohms. The five curves of FIG. 10 labeled $C_1$ to $C_5$ in the figure are for values of the variable capacity as follows:

|  | Mfd. |
|---|---|
| $C_1$ | 1.0 |
| $C_2$ | 1.1 |
| $C_3$ | 1.3 |
| $C_4$ | 1.5 |
| $C_5$ | 2.0 |

The phase angle $\theta$ is in practice small, of the order of a few degrees and may conveniently be expressed in minutes of arc, in which the scale of ordinates in FIG. 10 is calibrated. For unmineralized rock typical values of the phase angle $\theta$ are from 20 to 30 minutes of arc, and for mineralized rock containing disseminated sulphides typical values are from 60 to 120 minutes of arc.

The rate $\alpha$ of exponential decay of the residual voltage pulses $V_2$ is given by the reciprocal of the product of the variable capacity and the parallel resistance of (in the circuit of FIG. 6) resistances 82, 74 and 78 through which the capacity discharges.

The method of the invention provides the information from which the resistivity of the earth can be computed. Application of a scale factor to the reading of the meter 282 at the transmitter (FIG. 9) yields the average value of the transmitted current pulses, which may be called I. By average value here is meant the average over the length of the pulses only, not including the intervals between them. The average value of the voltage pulses at the receiver stakes, which may be called E, is similarly obtainable from the reading of the receiver galvanometer with switch 236 in position E, by application to this reading of a scale constant representing the difference between the essential square shape of the received voltage pulses and the response of the galvanometer to the $1/T_f$ sinusoidal component therein, and by the further application of a calibration factor representing the gain of the circuit between the stakes and the galvanometer itself, adjusted for the gain actually observed with switch 236 in position F.

From these values of transmitter current I and of voltage E between a pair of receiver stakes collinear with each other and with a transmitter stake (the other transmitter stake being assumed far enough away so that current flows radially and uniformly into the ground from the near transmitter stake), the resistivity of the earth may be computed from the following relation (referring to FIG. 9):

$$\rho = \frac{2\pi E}{I\left[\dfrac{1}{\text{separation in feet of stakes 284 and 132}} - \dfrac{1}{\text{separation in feet of stakes 284 and 130}}\right]}$$

Thus, essentially, the apparatus of FIGS. 2 and 5 measures the ratio of the amplitude of the voltage of frequency $1/T_f$ present in a succession of the time intervals or fractions $T_2$ of $T_f$ to the amplitude of the voltage of the same frequency present in a succession of the time intervals or fractions $T_1$ of $T_f$. The apparatus of FIGS. 6 and 8 measures the ratio of the first of these quantities to the amplitude of the voltage of frequency $1/T_f$ present in the complete received signal L of FIG. 4, i.e. in the fraction $1/1$ of the period $1/T_f$. The two ratios are of nearly but not quite the same values because both are small, just as in a case of arbitrary numbers $x$ and $y$, if $x$ is much bigger than $y$ the ratio $y/x$ is nearly equal to the ratio $y/x$ plus $y$.

While the invention has been described hereinabove in terms of a number of preferred embodiments, various modifications may be made therein without departing from the scope of the invention itself which is set forth in the appended claims.

We claim:

1. Apparatus for geophysical exploration comprising means to apply to the earth between spaced transmitter electrodes at a periodic rate current pulses of successively opposite polarity spaced by time intervals, and means to measure between spaced receiver electrodes contacting the earth, to the exclusion of other components, the ratio of the component of voltage periodic in said rate occurring during a fraction of the period of said rate falling within said intervals to the voltage component periodic at said rate occurring during the entire period of said rate.

2. Apparatus for geophysical exploration comprising means to apply to the earth between spaced transmitter electrodes at a periodic rate current pulses of successively opposite polarity spaced by time intervals, and means to measure between spaced receiver electrodes contacting the earth, to the exclusion of other components, the ratio of the component of voltage periodic in said rate occurring during a fraction of the period of said rate falling within said intervals to the voltage component periodic at said rate occurring during a fraction of said period included within said pulses.

3. In geophysical exploration operating by means of time-spaced current pulses of given periodicity, apparatus for measuring between spaced points of the earth the ratio of the component of signal voltage of said periodicity occurring during a fraction of the cycle of said periodicity falling within the time intervals between successive of said pulses as perceived at said points to the component of voltage of said periodicity occurring during another fraction of said cycle, said apparatus comprising two receiver electrodes, a motor synchronizing circuit having its input coupled to said electrodes, a motor-driven switch including a pair of contacts, said motor-driven switch being coupled to the output of said circuit, a variable resistance and a parallel combination of resistance and capacity connected in series between said electrodes, and a tuned galvanometer connectible by said contacts in shunt with said variable resistance, said contacts being driven by said synchronizing circuit to close periodically for a fraction of said cycle occurring in the time interval between said pulses.

4. In geophysical exploration operating by means of time-spaced current pulses of given periodicity, apparatus for measuring between spaced points of the earth the ratio of the component of signal voltage of said periodicity occurring during a fraction of the cycle of said periodicity falling within the time intervals between successive of said pulses as perceived at said points to the component of voltage of said periodicity occurring during another fraction of said cycle, said apparatus comprising two receiver electrodes, a synchronizing circuit coupled to said electrodes and adapted to develop from the voltage of said periodicity appearing across said electrodes a switching voltage of twice the said periodicity, two signal channels, a switch operated by said double periodicity voltage, said switch being coupled to sort at twice the rate of said cycle temporally successive fractions of said signal voltage to said channels, and means to measure the ratio of voltages in said two channels.

5. In geophysical prospecting, a current pulse transmitter comprising an electron oscillator, a rectifier, means controlled by said oscillator to key said rectifier into operation for one phase of the output wave of said oscillator, a reversing switch coupled to the output of said rectifier, means to drive said switch, and means controlled by said oscillator to control said driving means.

6. In geophysical prospecting, a current pulse transmitter comprising an electron oscillator adapted to develop a substantially rectangular voltage wave, a rectifier, means controlled by said voltage wave to energize said rectifier for one phase of said wave, a reversing switch coupled to the output of said rectifier, a frequency divider controlled by said oscillator, means to drive said switch, and means to control said driving means by the output signal from said frequency divider.

7. In geophysical prospecting, in combination, a transmitter adapted to apply to spaced electrodes conductively connected to the earth pulses of current spaced by time intervals, and receiver apparatus comprising spaced receiving electrodes, a series circuit including electrical resistance and capacity connected between said receiving electrodes, a switch, a galvanometer connectible upon operation of said switch in shunt with said resistance, electrically operated driving means coupled to said switch, and synchronizing means coupled between said receiving electrodes and driving means.

8. In geophysical prospecting, in combination, a transmitter adapted to apply to spaced electrodes conductively coupled to the earth pulses of current of succesisvely opposite polarity spaced by time intervals, said pulses being of substantially rectangular shape and having a ripple component thereon of frequency high compared to the repetition rate of said pulses, and receiver apparatus comprising receiver electrodes, a series circuit including adjustable electrical resistance and capacity connected between said receiving electrodes, a resistance connected in shunt with said capacity, a switch, a galvanometer connectible upon operation of said switch in shunt with said adjustable resistance, electrically operated driving means coupled to said switch, and synchronizing means responsive to trains of voltage oscillations of said ripple frequency coupled between said receiving electrodes and driving means.

9. Apparatus for geophysical prospecting comprising two electrodes adapted to be placed in contact with the earth at spaced locations, a series circuit including electrical capacity and resistance connected between said electrodes, a tuned galvanometer, means to connect said galvanometer in shunt with said resistance at a periodic rate, and synchronizing means coupled between said electrodes and said galvanometer-connecting means.

10. In geophysical prospecting, a voltage pulse receiver comprising two electrodes adapted to contact the earth at spaced points, a trigger circuit having its input coupled between said electrodes, an electronic oscillator having its input coupled to the output of said trigger circuit, a relay, a series circuit including adjustable resistance and capacity connected between said electrodes, a fixed resistance connected in shunt with said capacity, a galvanometer circuit preferentially responsive to an alternating current signal of frequency integrally related to the fundamental frequency of oscillation of said oscillator, and means including contacts of said relay for connecting said galvanometer circuit in shunt with said variable resistance at a periodic rate integrally related to said fundamental frequency of oscillation.

References Cited in the file of this patent

UNITED STATES PATENTS

| | | |
|---|---|---|
| 2,375,777 | Evjen | May 15, 1945 |
| 2,685,058 | Yost | July 27, 1954 |